United States Patent
Knoll et al.

(10) Patent No.: US 6,353,056 B1
(45) Date of Patent: Mar. 5, 2002

(54) METHOD FOR THE PRODUCTION OF BLOCK COPOLYMERS BY RETARDED ANIONIC POLYMERIZATION

(75) Inventors: Konrad Knoll, Ludwigshafen; Hermann Gausepohl, Mutterstadt; Volker Warzelhan, Weisenheim; Christian Schade, Ludwigshafen; Wolfgang Fischer, Walldorf, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,175

(22) PCT Filed: Feb. 5, 1999

(86) PCT No.: PCT/EP99/00774

§ 371 Date: Aug. 14, 2000

§ 102(e) Date: Aug. 14, 2000

(87) PCT Pub. No.: WO99/42506

PCT Pub. Date: Aug. 26, 1999

(30) Foreign Application Priority Data

Feb. 18, 1998 (DE) .......................................... 198 06 785

(51) Int. Cl.[7] ............................ C08F 297/04; C08F 4/46
(52) U.S. Cl. ......................... 525/98; 525/316; 526/340; 526/346; 526/347; 526/152; 526/124.2; 526/125.1; 526/177; 526/187

(58) Field of Search .................... 525/98, 316; 526/340, 526/346, 347, 152, 124.2, 125.1, 177, 187

(56) References Cited

U.S. PATENT DOCUMENTS

| 3,716,495 A | | 2/1973 | Hsieh |
| 4,112,210 A | * | 9/1978 | DeZarauz .................... 526/187 |
| 4,616,065 A | | 10/1986 | Hargis |

FOREIGN PATENT DOCUMENTS

| DE | 26 28 380 | 12/1976 |
| EP | 234 512 | 9/1987 |
| EP | 434 131 | 6/1991 |
| WO | 97/33923 | 9/1997 |
| WO | 98/07765 | 2/1998 |
| WO | 98/07766 | 2/1998 |

OTHER PUBLICATIONS

J.Am.Chem.Soc., vol. 82 (1960), 6000–6005, Welsch.
Macromolecules, vol. 19, 1966, 299–304.

* cited by examiner

Primary Examiner—Samuel A. Acquah
Assistant Examiner—Olga Asinovsky
(74) Attorney, Agent, or Firm—Keil & Weinkauf

(57) ABSTRACT

In a process for the preparation of block copolymers from vinylaromatic monomers and dienes, the monomers are polymerized in the presence of at least one alkali metal organyl or alkali metal alkoxide and at least one magnesium, aluminum or zinc organyl.

11 Claims, No Drawings

METHOD FOR THE PRODUCTION OF BLOCK COPOLYMERS BY RETARDED ANIONIC POLYMERIZATION

The present invention relates to a process for the preparation of block copolymers from vinylaromatic monomers and dienes.

Anionic polymerizations typically proceed very rapidly, so that they are difficult to control on an industrial scale owing to the considerable amount of heat generated. Lowering the polymerization temperature results in an excessive increase in viscosity, in particular with a concentrated solution. Reducing the initiator concentration increases the molecular weight of the polymer formed. Controlling the reaction by appropriate dilution of the monomers results in a higher solvent requirement and lower space-time yields.

It has therefore been proposed to include in the anionic polymerization initiators various additives to influence the polymerization rate.

The effect of Lewis acids and Lewis bases on the rate of the anionic polymerization of styrene was described in Welch, Journal of the American Chemical Society, 82 (1960), 6000–6005. For instance, it has been found that small amounts of Lewis bases such as ethers and amines accelerate the n-butyllithium-initiated polymerization of styrene at 30° C. in benzene, whereas Lewis acids such as zinc and aluminum alkyls reduce the polymerization rate or, when used in superstoichiometric amounts, stop the polymerization completely.

In Macromolecules, 19 (1966), 299–304, Hsieh and Wang investigate the complexation of dibutylmagnesium with the alkyllithium initiator or the living polymer chain, respectively, in the presence or absence of tetrahydrofuran and discover that dibutylmagnesium reduces the polymerization rate of styrene and butadiene without affecting the stereochemistry. U.S. Pat. No. 3,716,495 discloses initiator compositions for the polymerization of conjugated dienes and vinylaromatics where a more efficient use of the lithium alkyl as initiator is achieved by the addition of a metal alkyl of a metal of group 2a, 2b or 3a of the Periodic Table of the Elements, such as diethylzinc and polar compounds such as ethers or amines. Owing to the required large amounts of solvent, relatively low temperatures and long reaction times in the region of several hours, the space-time yields are correspondingly low.

WO97/33923 describes initiator compositions which are useful for the anionic polymerization of vinyl monomers, comprise alkali metal and magnesium compounds bearing hydrocarbon radicals and have a molar [Mg]/[alkali metal] ratio of at least 4.

Earlier, Patent application PCT/EP97/04497, unpublished at the priority date of the present invention, describes continuous processes for the anionic polymerization or copolymerization of styrene or diene monomers using alkali metal alkyl as polymerization initiator in the presence of an at least bivalent element as a retarder.

PCT/EP97/04498, which was also unpublished at the priority date of the present invention, describes processes for the anionic polymerization of dienes and/or vinylaromatic monomers in a vinylaromatic monomer or monomer mixture in the presence of a metal alkyl or aryl of an at least bivalent element without added Lewis bases.

Various initiator mixtures which may comprise alkali metals, alkaline earth metals, aluminum, zinc or rare earth metals are known, for example, from EP-A 0 234 512 for the polymerization of conjugated dienes with a high degree of 1,4-trans-linking. German Offenlegungsschrift 26 28 380 teaches, for example, the use of alkaline earth aluminates as cocatalyst in conjunction with an organolithium initiator for the preparation of polymers or copolymers of conjugated dienes having a high trans-1,4-linkage content and low 1,2-linkage or 3,4-linkage content. This is said to lead to an increase in polymerization rate.

It is an object of the present invention to provide a process for the preparation of block copolymers from vinylaromatic monomers and dienes which does not have the abovementioned disadvantages and which can be conducted in a controlled manner, in particular at high monomer concentrations.

We have found that this object is achieved by a process for the preparation of block copolymers from vinylaromatic monomers and dienes in which the monomers are polymerized in the presence of at least one alkali metal organyl or alkali metal alkoxide and at least one magnesium, aluminum or zinc organyl.

Alkali metal organyls which may be used are mono-, bi- or multifunctional alkali metal alkyls, aryls or aralkyls customarily used as anionic polymerization initiators. It is advantageous to use organolithium compounds such as ethyllithium, propyllithium, isopropyllithium, n-butyllithium, sec-butyllithium, tert-butyllithium, phenyllithium, diphenylhexyllithium, hexamethylenedilithium, butadienyllithium, isoprenyllithium, polystyryllithium or the multifunctional compounds 1,4-dilithiobutane, 1,4-dilithio-2-butene or 1,4-dilithiobenzene. The amount of alkali metal organyl required depends on the desired molecular weight, the type and amount of the other metal organyls used and the polymerization temperature and is typically in the range from 0.0001 to 5 mol percent, based on the total amount of monomers.

Alkali metal alkoxides which may be used, alone or in a mixture, are aliphatic, aromatic or araliphatic alkoxides of lithium, sodium or potassium. Examples are lithium, sodium or potassium methoxide, ethoxide, n-propoxide, isopropoxide, n-butoxide, sec-butoxide, tert-butoxide, n-pentoxide, isopentoxide, hexoxide, amyl alkoxide, phenoxide, mentholate, 2,4-di-tert-butylphenoxide, 2,6-di-tert-butylphenoxide, 3,5-di-tert-butylphenoxide, 2,4-ditert-butyl-4-methylphenoxide and trimethylsilanoate. Preference is given to using the methoxides, ethoxides, tert-butyl-substituted phenoxides or branched alkylalkoxides, in particular lithium tert-butoxide, amylate or 3,7-dimethyl-3-octoxide.

Useful magnesium organyls are those of the formula $R_2Mg$, wherein the radicals R are each, independently of one another, hydrogen, halogen, $C_1$–$C_{20}$-alkyl or $C_6$–$C_{20}$-aryl. Preference is given to using ethyl, propyl, butyl, hexyl or octyl compounds which are commercially available. Particular preference is given to using (n-butyl) (s-butyl) magnesium which is soluble in hydrocarbons.

Aluminum organyls which may be used are those of the formula $R_3Al$, wherein the radicals R are each, independently of one another, hydrogen, halogen, $C_1$–$C_{20}$-alkyl or $C_6$–$C_{20}$-aryl. Preferred aluminum organyls are aluminum trialkyls. Particular preference is given to using triisobutyl aluminum.

Zinc organyls which may be used are those of the formula $R_2Zn$, wherein the radicals R are each, independently of one another, hydrogen, halogen, $C_1$–$C_{20}$-alkyl or $C_6$–$C_{20}$-aryl. Preferred zinc organyls are zinc dialkyls. Particular preference is given to using diethyl zinc.

The aluminum, magnesium or zinc alkyls may also be present in partially or completely hydrolyzed, alcoholized or aminolyzed form.

Particular preference is given to using sec-butyllithium together with dibutylmagnesium or triisobutyl aluminum.

The molar ratios of the metal organyls with respect to each other may vary within wide limits, but depend primarily on the desired retardation effect, the polymerization temperature, the monomer composition and concentration and the desired molecular weight.

The molar ratio of magnesium, aluminum or zinc, respectively, to alkali metal is preferably in the range from 0.1 to 100, preferably in the range from 1 to 10.

In a preferred embodiment, the polymerization is carried out in the presence of an alkali metal organyl, an aluminum organyl and a magnesium organyl. The molar ratio of magnesium to alkali metal is advantageously in the range from 0.2 to 3.8, the molar ratio of aluminum to alkali metal in the range from 0.2 to 4. The molar ratio of magnesium to aluminum is preferably in the range from 0.005 to 8.

In the process of the invention use is made primarily of alkali metal organyls, magnesium, aluminum and zinc organyls. Barium, calcium or strontium organyls are preferably only present in ineffective amounts not having a significant effect on the polymerization rate or copolymerization parameters. Nor should transition metals or lanthanoids, especially titanium or zirconium, be present in significant amounts.

The alkali metal, magnesium, aluminum and zinc organyls may be added to the monomer mixture together or separately and at different times or different locations. The alkali metal, magnesium and aluminum alkyls are preferably used in the form of a premixed initiator composition.

The initiator composition may be prepared by dissolving the alkali metal organyls, magnesium, aluminum and zinc organyls in an inert hydrocarbon solvent, for example n-hexane, cyclohexane, white paraffin or toluene and combining them. The metal organyls dissolved in the hydrocarbons are preferably homogeneously mixed and allowed to age at a temperature in the range from 0 to 120° C. for at least 2 minutes, preferably at least 20 minutes. A solubilizer, for example diphenylethylene, can be added, if necessary, to prevent the precipitation of one of the components from this initiator solution.

The initiator system may affect the copolymerization parameters of vinylaromatic monomers and dienes. Depending on the type and ratios of the metal organyls, soft blocks B or B/S having a relatively high or low vinylaromatic monomer content are thereby obtained. For example, when using s-butyllithium and dibutylmagnesium at a molar Mg/Li ratio of less than 2, the copolymerization of styrene and butadiene affords butadiene blocks having a low styrene content. Mg/Li ratios of 4 preferentially produce a random butadiene-styrene soft block B/S. Furthermore, the random incorporation of styrene is favored by using alkoxides such as dialkylaluminum alkoxides or potassium alkoxides.

The retardation does not significantly affect the relative polymerization rate of styrene and butadiene, i.e. butadiene polymerizes very much slower and, in a mixture with styrene, has itself a retarding effect on the overall conversion rate.

Preferred monomers are styrene, α-methylstyrene, p-methylstyrene, ethylstyrene, tert.-butylstyrene, vinyltoluene or 1,1-diphenylethylene, butadiene, isoprene, 2,3-dimethylbutadiene, 1,3-pentadiene, 1,3-hexadiene or piperylene or mixtures thereof.

The polymerization may be carried out in the presence of a solvent. Suitable solvents are the aliphatic, cycloaliphatic or aromatic hydrocarbons having from 4 to 12 carbon atoms which are generally used for anionic polymerization, such as pentane, hexane, heptane, cyclohexane, methylcyclohexane, isooctane, benzene, alkylbenzenes such as toluene, xylene, ethylbenzene or decalin or suitable mixtures. Obviously, the solvent should have the high purity which is typically required for the process. The solvents may be dried over aluminum oxide or molecular sieve and be distilled prior to use to remove protic substances. The solvent from the process is preferably reused after condensation and the abovementioned purification.

It is possible to adjust the retarding effects within wide temperature ranges via the composition and amount of the metal organyls. It is therefore also possible to carry out the polymerization at initial monomer concentrations in the range from 50 to 100 percent by volume, particularly from 70 to 100 percent by volume, which lead to highly viscous polymer solutions and require higher temperatures, at least at higher conversions.

The target products are block copolymers of vinylaromatic monomers and dienes. Styrene-butadiene block copolymers are preferably obtained.

Preference is given to block copolymers comprising at least one hard block S composed of vinylaromatic monomers and at least one soft block B composed of dienes or one soft block S/B composed of vinylaromatic monomers and dienes in random sequence. The soft blocks may be formed essentially from dienes (soft blocks B) or from dienes and vinylaromatic monomers in random sequence (blocks S/B). The individual blocks may also be tapered and include, for example, a B→S/B, $(S/B)_1→(S/B)_2$, B→S, (S/B)→S gradient. The soft blocks may also be composed of different soft blocks arranged in any order and may occur repeatedly, for example block B-S/B, block $(S/B)_1–(S/B)_2$. Particular preference is given to preparing linear block copolymers comprising S-B, S-B-S, S-S/B-S, S-B-S/B-S, $S-S/B_1-S/B_2-S$ block structures. The individual blocks may be of equal or different length, i.e. the triblock copolymers may be symmetrical or asymmetrical.

The block transitions may be sharp or tapered, i.e. the blocks S contain a significant proportion of copolymerized diene monomers and the blocks B contain a significant proportion of copolymerized vinylaromatic monomers in the transition area.

The block copolymers have different properties, depending on their structure and composition. Preferred block copolymers are those which have elastomeric properties. They comprise at least the structural unit S-B-S or S-S/B-S in the form of a linear or star block copolymer. The soft phase, expressed as the sum of all soft blocks, is in the range from 50 to 90 percent by volume, preferably in the range from 60 to 80 percent by volume, particularly preferably in the range from 65 to 75 percent by volume.

Further preference is given to rigid block copolymers which at the same time are transparent and impact-resistant. They also comprise at least the structural unit S-B-S or S-S/B-S in the form of a linear or star block copolymer. The soft phase, expressed as the sum of all soft blocks, is in the range from 5 to 50 percent by volume, preferably in the range from 10 to 40 percent by volume, particularly preferably in the range from 15 to 30 percent by volume. Particular preference is given to a S1-S/B-S2 or $S_1-B→S_2$ block structure with a tapered transition and an S1 block length in the range from 10,000 to 30,000 g/mol and an S2 block length of more than 50,000 g/mol.

The process of the invention may be carried out in any pressure- and temperature-resistant reactor, it being possible in principle to use backmixing or non-backmixing reactors (i.e. reactors having stir tank or tubular reactor characteristics). Depending on the choice of initiator concentration and composition, the particular process route applied and other parameters, such as temperature and possibly temperature profile, the process of the present invention leads to polymers having high or low molecular weight. It is possible to use, for example, stirred tanks, tower reactors, loop reactors and tubular reactors or tube bundle reactors with or without internals. Internals may be static or mobile.

The polymerization is preferably carried out continuously. Suitable reactors are, for example, tubular reactors or tube bundle reactors with or without mixing elements such as Sulzer mixers, stirred tanks or continuous stirred tank reactors, loop or recycle reactors, tower reactors, list reactors (self-cleaning), extruders, etc. The reactors may be used individually or may be appropriately combined and may be equipped with one or more feed lines, for example for monomers or initiators.

A part of the conversion, preferably the conversion above 50%, in particular above 70%, based on the total amount of monomers, is carried out in a non-backmixing reactor or reactor section, in particular if little or no solvent is added. Suitable reactors are, for example, tube and tube bundle reactors, tower reactors or extruders. Preference is given to using an extruder, the shafts of which are sealed towards the transmission.

The initiator composition according to the invention makes it possible to significantly reduce the reaction rate or increase the temperature, respectively, without affecting the polymer properties compared to anionic polymerization using an alkali metal organyl; this makes it possible, on the one hand, to spread out the generation of the heat of polymerization over a longer period of time and thus control, in a continuous process, the temperature profile as a function of time or location, e.g. in the tubular reactor. It is possible, for example, to ensure that a high temperature does not occur at initially high monomer concentration, whereas, on the other hand, a trouble-free polymerization is possible at the high temperature which is finally (i.e. at higher conversion) reached while achieving a high space-time yield at the same time.

In a preferred procedure, the vinylaromatic monomer is polymerized in the presence of an alkali metal organyl and at least one magnesium, aluminum or zinc organyl without any further solvent (apart from small amounts which may be used to dissolve the metal organyls). After a conversion which leads to the formation of a hard block S having the desired block length, the diene is added to the solution of the resulting block S in monomeric vinylaromatic monomer, if necessary with cooling. The diene may be added all at once or continuously over a relatively long period of time or in more than one portion. After addition of butadiene and, if necessary, heating of the polymerization solution, a random S/B block is formed which has a vinylaromatic monomer content which is strongly dependent on the initiator system chosen. The diene concentration decreases as the polymerization proceeds, and a gradient towards the vinylaromatic monomer is obtained. When the diene is completely consumed, the remaining vinylaromatic monomer polymerizes to form another block S. The polymerization is preferably carried out in a tubular reactor or in an extruder until monomer conversion is complete. Owing to the increasing viscosity towards the end of the polymerization, the temperature of the polymer melt to form the last styrene block should be advantageously at least 20–30° C. above the glass transition temperature of the vinylaromatic polymer, i.e. in the case of styrene polymers above about 130° C. The melt is protonated and stabilized and may then be heated to usual processing temperatures (180–240° C.). This procedure yields, for example, symmetrical or unsymmetrical triblock copolymers S-S/B-S having a central soft block and a tapered diene/vinylaromatics block transition.

The process is particularly preferably used for the preparation of a styrene-butadiene-styrene triblock copolymer, in which a polystyrene block dissolved in monomeric styrene is prepared by partial conversion of styrene, a soft block comprising butadiene is added by addition of butadiene and the residual styrene monomer is polymerized at temperatures of at least 20° C. above the glass transition temperature of the resulting block copolymer until conversion is complete.

The block copolymers may be polymerized in the presence of a multifunctional alkali metal organyl or linked in a star-like manner after the polymerization using a multifunctional coupling agent such as polyfunctional aldehydes, ketones, esters, anhydrides or epoxides. Coupling of identical or different blocks may yield symmetrical and asymmetrical star block copolymers comprising arms having the abovementioned block structures.

After the polymerization is completed, the living polymer chains may be capped with a chain terminator, instead of being coupled. Suitable chain terminators are protic substances or Lewis acids such as water, alcohols, aliphatic or aromatic carboxylic acids and inorganic acids such as carbonic acid or boric acid.

The block copolymers are usually mixed with stabilizers. Examples of suitable stabilizers include sterically hindered phenols such as Irganox® 1076 or Irganox® 3052 from Ciba-Geigy, Basle, or α-tocopherol (Vitamin E).

Chain termination and stabilization may be conducted in separate steps or in one step. This may be achieved, for example, by using a solution of a carboxylic acid such as formic acid or acetic acid, an alcohol such as methanol, ethanol, butanol, propanol, and one of the above stabilizers in a suitable solvent such as ethylbenzene.

In industrial scale processes, it is advantageous to add the stabilizer in a solvent-free, liquid form. In this case, the living polymer melt is first deactivated using from 0.1 to 5% by weight of water, based on the block copolymer. Immediately thereafter, e.g. 25.6 g of a mixture of the following composition may be added per kg of polymer melt:

| Irganox 3052 | 13.7% | Stabilizer |
| TNPP | 33.2% | Stabilizer |
| Oleic acid | 53.1% | Acidification |

EXAMPLES

Example 1

Preparation of a styrene-butadiene block copolymer 4500 g of styrene were placed in a 10 l stirred tank and cooled down to 12° C. At this temperature, 68 ml of a 0.5-molar solution of dibutylmagnesium in white paraffin and 16 ml of a 1.6-molar solution of sec-butyllithium in white paraffin were added successively and the stirred tank was slowly heated to 30° C. 44 minutes after the addition of the initiator, the bulk temperature rose to 53° C. The solids content was 16.6% at this time. The polymerization of the styrene block was then stopped by cooling to 30° C. and adding 1500 g of butadiene. The stirred tank was then slowly reheated to 70° C., with an exothermic reaction being observed at significantly higher bulk temperature. A solids content of 35% and a bulk temperature of 860° C. were reached 75 minutes after butadiene addition. The monomeric butadiene content was 2–3%. The polymerization was then stopped by cooling to 15° C.

Example 2

Preparation of a styrene-butadiene-styrene triblock copolymer

The living styrene-butadiene block copolymer solution in styrene obtained as described in Example 1 was processed in an extruder.

Extruder design

A W&P ZSK 25 extruder, L/D=30, was used. The polymerization zone was equipped with kneading elements followed by one blocking and one conveying element each for adding terminator/stabilizer and for devolatilization/deodorization and discharge.

Conditioning of the extruder:

The extruder was flushed with an about 0.1-molar mixture of secbutyllithium in white paraffin and about 0.5% by weight of diphenylethylene together with Luflexen HX (metallocene-catalyzed polyethylene from BASF) to remove contaminants and humidity. Once the Luflexen/white paraffin strand had assumed a permanent red color, the addition of the white paraffin/sec-butyllithium mixture was stopped and the addition of the Luflexen was reduced to such an extend that the screw was just sealed toward the back.

Polymerization of the second styrene block:

The polymerization mixture obtained in Example 1 was then continuously metered into the extruder at 1.5 kg/h using a gear pump. The extruder was operated at 50 revolutions per minute. The temperature was adjusted to 120° C. at the point of metering of the living polymer solution, to 140 and 150° C. in the polymerization zone including termination zone and to 210° C. in the devolatilization section. The exiting colorless strand was cooled in a water bath and pelletized. The residual styrene content was less than 100 ppm.

Stabilizer solution:

Termination, acidification and stabilization of the styrene-butadiene block copolymer were carried out in one step. This was achieved by adding 100 g per 1 kg of polymer melt of a solution of the composition shown in Table 1 after the polymerization zone.

| Irganox ® 3052 | 3.5% | Stabilizer |
| TNPP | 8.5% | Stabilizer |
| Acetic acid | 1.9% | Acidification |
| Ethanol | 21.9% | Anion termination |
| Ethylbenzene | 64.3% | Solvent for metering |

The example was repeated with a throughput of 2 and 2.5 kg/h. The residual styrene contents were also below 100 ppm.

We claim:

1. A process for the preparation of block copolymers from vinylaromatic monomers and dienes in the presence of at least one alkali metal organyl or alkali metal alkoxide and at least one magnesium, aluminum or zinc organyl, which comprises carrying out the polymerization at an initial monomer concentration in the range from 50 to 100 percent by volume.

2. A process as claimed in claim 1, wherein the alkali metal organyl used is a lithium organyl.

3. A process as claimed in claim 1, wherein the molar ratio of magnesium, aluminum or zinc, respectively, to alkali metal is in the range from 0.1 to 100.

4. A process as claimed in claim 1, wherein block copolymers comprising at least one hard block S composed of vinylaromatic monomers and at least one soft block B composed of dienes or a soft block S/B composed of vinylaromatic monomers and dienes in random sequence are prepared.

5. A process as claimed in claim 1, wherein block copolymers comprising S-B-S, S-S/B-S, S-B-S/B-S, S-S/B1-S/B2-S block structures are prepared.

6. A process as claimed in claim 5, wherein linear or star block copolymers having a soft phase content, expressed as the sum of all soft blocks, in the range from 50 to 90 percent by volume are prepared.

7. A process as claimed in claim 5, wherein linear or star block copolymers having a soft phase content, expressed as the sum of all soft blocks, in the range from 5 to 50 percent by volume, and different block lengths of the terminal hard blocks S are prepared.

8. A process as claimed in claim 1, wherein the block copolymers are polymerized in the presence of a multifunctional alkali metal organyl or linked in a star-like manner after the polymerization using a multifunctional coupling agent.

9. A process as claimed in claim 1, for the preparation of a styrene-butadiene-styrene triblock copolymer, wherein a polystyrene block dissolved in monomeric styrene is prepared by partial conversion of styrene, a soft block comprising butadiene is added by addition of butadiene and the residual styrene monomer is polymerized at temperatures of at least 20° C. above the glass transition temperature of the resulting block copolymer until conversion is complete.

10. A process as claimed in claim 1, wherein the polymerization is carried out continuously.

11. A process as claimed in claim 1, wherein at least a part of the conversion is carried out in a non-backmixing reactor or reactor section.

* * * * *